March 29, 1966  S. R. BORGQUIST  3,243,205
COMBINATION ENVELOPE AND STATEMENT FORM
Filed March 18, 1964  3 Sheets-Sheet 1

STANLEY R. BORGQUIST
INVENTOR.

BY
LeRoy J. Leishman
AGENT

March 29, 1966  S. R. BORGQUIST  3,243,205
COMBINATION ENVELOPE AND STATEMENT FORM
Filed March 18, 1964  3 Sheets-Sheet 2

STANLEY R. BORGQUIST
INVENTOR.

BY
LeRoy J. Leishman
AGENT

March 29, 1966     S. R. BORGQUIST     3,243,205
COMBINATION ENVELOPE AND STATEMENT FORM
Filed March 18, 1964     3 Sheets-Sheet 3
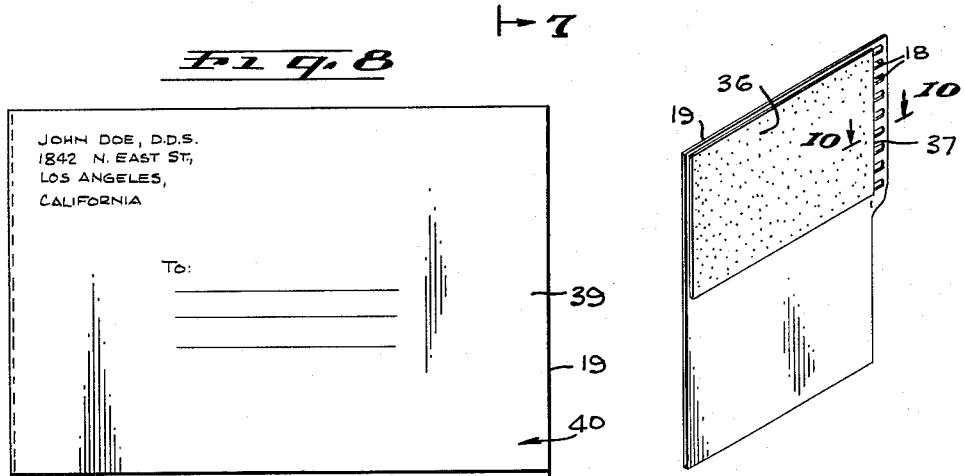
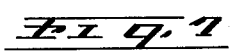
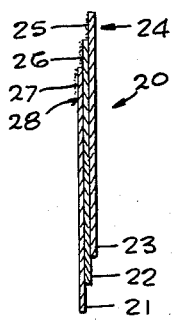
STANLEY R. BORGQUIST
INVENTOR.
BY LeRoy J. Leishman
AGENT

United States Patent Office 3,243,205
Patented Mar. 29, 1966

3,243,205
COMBINATION ENVELOPE AND STATEMENT FORM
Stanley R. Borgquist, 167 S. Manning Ave.,
Los Angeles, Calif.
Filed Mar. 18, 1964, Ser. No. 352,736
8 Claims. (Cl. 282—25)

The invention herein described pertains to so-called writing board, or peg board, systems of making accounting entries, and more particularly to a combination statement form, mailing envelope and return envelope for use with such systems.

Simplified bookkeeping and business form systems that reduce the number of entries required have recently come into wide use. Some of these use superimposed receipt, statement and ledger forms whereby the making of a single entry on the receipt form automatically produces an identical entry not only upon a ledger or journal sheet, but also upon a form which becomes the monthly statement. These are widely used, particularly by doctors and dentists.

One object of the present invention is to provide a simple form that not only constitutes a statement blank upon which several entries may be made, either directly or indirectly, but which eventually becomes the envelope in which the statement is mailed to the customer or patient as well as a return envelope bearing the creditor's address for the convenience of the customer or patient in mailing his remittance.

Another object of the present invention is to provide a combined form of the type described that will incorporate simple means whereby each succeeding entry on the statement form will be properly registered with respect to a ledger or journal sheet so that the individual entries that are made or impressed on the statement form will appear month after month in the proper sequential positions on a permanent ledger or journal sheet.

A further object is to provide the undersurface of the statement form with suitable pressure-sensitive chemicals or an attached sheet of carbon paper whereby the pressure that makes the entry on the statement form will also produce a duplicate entry on the ledger or journal sheet.

An additional object is to provide a form of the type described having adhesive material so positioned thereon that the statement-envelope may not only be readily sealed but also readily opened without destroying or mutilating the statement.

Another object is to provide such perforations or tearing guides or indices on the form that the customer or patient may readily detach the statement portion without destroying or mutilating the portion of the form that is to become the return envelope.

Still another object is to include a portion in the total form that will become the flap of the return envelope, and to provide thereon a moisture-sensitive adhesive, or other suitable adhesive, for sealing the flap of the return envelope.

This invention possesses many other advantages, and has other objects which may be made more clearly apparent from a consideration of an illustrative embodiment of the invention. For this purpose, such an embodiment is shown in the drawings, which also include illustrations of the manner in which duplicate and triplicate entries may be made. These drawings and their significance will now be described in detail in order to illustrate the general principles of the invention; but it is to be understood that this detailed description is not to be taken in a limiting sense, since the scope of the invention is best defined by the appended claims.

In the drawings:
FIGURE 1 shows a writing board, or peg board, upon which a ledger sheet, a combined statement and envelope form, and a receipt pad have been superimposed and registered by means of a row of pegs on the board and suitable indexing holes in the ledger sheet, in the statement form and in the receipt form;

FIG. 2 is a section taken on line 2—2 of FIG. 1;

FIG. 3 is a portion of a ledger sheet suitable for use with a peg board and with a combined statement and envelope embodying the present invention;

FIG. 4 shows the top surface of a combined statement and envelope embodying the invention and construction for proper registration with the ledger sheet and writing board;

FIG. 5 is a section taken substantially on line 5—5 of FIG. 4, and showing in phantom how the statement portion may be folded down to constitute a flap or cover;

FIG. 6 is a top view of a pad of receipt forms for use with the invention herein described, with a portion of the lower right hand corner of each sheet torn away to reveal the structure more clearly;

FIG. 7 is a section taken on line 7—7 of FIG. 6;

FIG. 8 shows the statement and envelope form with the portion removed that bears the registration holes, and with the top of the statement shown in FIG. 4 folded down in order to provide the top surface or elongated flap of the combined statement and envelope;

FIG. 9 is an isometric view of the back portion of the form shown in FIG. 4, revealing the carbon paper or other pressure-sensitive means whereby the entries that are received on the statement form are transferred to the ledger or journal sheet; and FIG. 10 is a section taken on the line 10—10 of FIG. 9.

The instant invention will probably be most readily understood if reference is first made to FIG. 1. This figure shows a writing board 11 having a series of pegs or posts 12 equally spaced and aligned along one edge of the board, the edge in this case being the edge that is at the left. For right-handed people, which are of course in the majority, it is more convenient to have the pegs on the left side of the board than on the right.

Entries may of course be made in various ways, and the combined statement and envelope may be used in conjunction with a variety of forms.

The use of the statement and envelope form will be explained by showing one manner in which it may be used, and an entry made thereon, when a dental patient is to be given a receipt on the occasion of a visit to the dentist's office.

The patient's ledger sheet 13 is first placed right side up on the writing board 11 with the various indexing apertures 14 pressed down, over and around the pegs 12. The top indexing hole in the sheet 13 should be indexed with the top peg 12 of the long row of pegs.

The patient's current statement form 19, which may normally be kept with his ledger sheet, is then so positioned over the ledger sheet that the line on which the new entry is to be made on the statement sheet will be directly superimposed over the line on the ledger sheet 13 where the duplicate entry should appear. If the entry is to be the first one on the ledger sheet 13, then the statement form must be so positioned that the horizontal entry column 16 of the statement form (FIG. 4) will be superposed over the horizontal entry column 17 (FIG. 3) of the ledger sheet. The statement sheet 19 (FIG. 1) may be registered and held in this position by pressing the apertures 18 down and around the proper indexing page 12 that will be protruding above the indexing holes 14 in the ledger sheet 13.

The pad of receipt blanks 20, shown in FIGS. 6, 7 and 1, must then be properly positioned on top of the statement form. The sheets or pages of this pad are not individually superimposed within the pad as would be true with most pads of printed forms, but are each offset with respect to the adjoining one, as indicated in FIGS. 6, 7 and 1, where it will be observed that the third sheet 21 extends below the middle sheet 22, and that the middle sheet extends below the top sheet 23. Inasmuch as all these sheets have the same vertical dimension, the offset condition shown in FIGS. 1 and 6 will cause the top edges of the receipt forms to be staggered as shown in FIG. 7 in the manner of shingles being laid on a roof. The top horizontal column that is in line with the arrow 24 in FIG. 6 thus extends above or vertically beyond the top edge of the sheet 22; and the corresponding part of sheet 22, as indicated at the top portion of FIG. 7, likewise extends above the top edge of the lower of the three sheets 21.

Aside from the patient's name, which is written or typed in the space 29 in the upper right hand corner of the receipt form, the most important entries that are made upon this particular receipt form are made in the top horizontal column 24, and these entries are made in the small rectangles above the code letters o, a, b, c and d in the rectangles just below them. Various other code letters may of course be used on forms of this type, these particular ones being used here merely for purposes of illustration, although various printed forms for peg board systems use these particular code letters. The making of the entries in these rectangles, usually with a pencil or ball point pen, must produce identical entries on the patient's statement form just below the receipt form, as well as upon the patient's ledger sheet underneath the statement form. This is all effected by means of a carbon coating or an invisible chemical coating that is sensitive to pressure. In the illustrated embodiment, the backs of the receipt pages shown in FIG. 7 are carbon coated from position 28 on the back of sheet 21 to the top edge of sheet 23.

Inasmuch as no carbon coating appears on the back of sheet 23 directly over the portion 26 of the middle sheet 22, and since there is likewise no corresponding coating on the portion of the back of sheet 22 that is directly in contact with the upper surface of sheet 21 opposite from the reverse portion of this sheet, it is possible for the manufacturer to coat parts of all these overlapping sheets at the same time by painting, printing, or otherwise coating the back portions of all the sheets simultaneously in one operation from point 28 on the back of sheet 21 to the extreme top edge of the upper sheet 23.

When there is carbon coating on the above identified areas, any pressure applied in making the entries along the horizontal column 24 of the top sheet, shown in FIG. 6, will cause a corresponding entry to be made on the patient's statement form if the pad of receipts has been properly positioned over the statement form and the perforations 30 in the receipts pressed down and over the proper pegs 12. The proper position and proper pegs may be determined by placing the top edge 31 (FIG. 1) of the receipt form just above the horizontal column on the statement form if it is the first entry to be made on the statement form, or by placing it just below the last entry on the statement form if one or more entries have already been made.

Inasmuch as the top horizontal column of each receipt sheet always extends above the top edge of the receipt form that is immediately beneath, the entry on the particular receipt sheet that is uppermost will of course cause no impression to be made on any of the other receipt forms.

The back of the combined statement and envelope form 19 is provided with a removable sheet of carbon paper 36. As long as this sheet of carbon paper remains attached to the form 19, the making of entries that appear upon the statement sheet 19 of course causes corresponding entries upon the ledger sheet 13. In this manner a permanent office copy is produced.

As shown in FIG. 1, the right end of the receipt pad extends beyond the extreme right edge of the statement sheet. Accordingly, the process of filling the patient's name in the rectangular space 29 makes no entry whatever either on the patient's ledger sheet 13 or upon his own statement sheet 19. The entry of the old balance, however, in the space 32 in the receipt form makes a corresponding entry of the old balance upon the patient's ledger sheet 13, but it makes no entry whatever upon the patient's statement sheet 19, for the reason that the rectangular space extends laterally beyond the extreme right edge of the statement sheet, as will be seen in FIG. 1.

At the end of the month, after only a single receipt has been issued on the occasion of an office call, or after a series of receipts have been issued during the month, one or more entries will have been made on the patient's statement form 19 and upon his ledger sheet 13.

The portion 41 of the form 19 which extends to the left of the row of perforations 33 (FIG. 4) is then torn off. This is the portion that contains the indexing apertures 18, which by now will have served their purpose, and it also includes the edge 37 (FIG. 9) of the carbon sheet where the carbon sheet is connected to the back of the statement portion 19 of the combined envelope and statement form. The portion 41 and the attached carbon sheet 36 should of course be discarded.

The upper portion of the statement form 19 may now be folded down along line 34 (FIG. 4) to the position shown in phantom in FIG. 5. If the patch of adhesive 35 at the top of the statement form has been moistened, it will adhere to the outside of the envelope at the position identified by the nnumeral 38 in FIG. 4. The reverse side of the statement form that previously overlaid the carbon sheet 36 is usually imprinted with the address of the doctor or firm rendering the statement, as shown in FIG. 8; and the back of the long flap that constitutes the statement form now becomes the front 39 of the mailing envelope 40.

When the customer or patient makes his remittance, he tears off the statement portion 19 of the combined statement and envelope form along the line or row of perforations 34 (FIG. 4) and retains the statement for his own records. It will be observed that this line 34 is spaced by a considerable distance from the top edge 42 of the envelope proper. The form is preferably scored at line 43. The portion of the total form now remaining between line 43 and the top edge 34 constitutes the flap 44 of the return envelope. This may appropriately be called a flap stub, as it is a portion of the longer flap of which the statement was a part. A strip of adhesive 45 extends along the top edge of this flap stub. The adhesive may be moistened (if it is not pressure sensitive) and the flap stub then folded down along the scoring line 43 to seal what now becomes the return envelope. The front of this return envelope customarily bears not only the printed address of the doctor or business firm rendering the statement, but also appropriate lines for the address of the remitter.

It will be observed that the entire form 19 may consist of a single sheet of paper folded to produce the infolds 46 and 47 and the section 48 that constitutes the front of the return envelope. The section 48 is of course secured to the in-flaps 46 and 47 by a suitable adhesive.

It is not essential, of course, that the form 19 be fabricated from a single sheet of paper, nor that the material be specifically paper. Substitutes may be used and the completed form may be fabricated from individual sheets that are appropriately joined.

Various other modifications may be made from the illustrative embodiment of the invention hereinbefore described and shown in the drawings. A sheet of carbon paper may be used in lieu of the carbon coating on the back of the receipt, or pressure-sensitive recording paper, such as the well known NCR paper or coating, may be used for recording the duplicate entries instead of including carbon paper, such as the sheet 36, as an integral part of the form. Still other variations, substitutions, additions or transpositions may be made—all without departure from the broad spirit of the invention as succinctly set forth in the appended claims.

The inventor claims:

1. A combination envelope and statement form for use with an accounting system employing a writing board having a row of aligned pegs for aligning and registering super-imposed forms, said combination comprising: an envelope closed at both ends and having an elongated flap that is an integral extension of one of the walls of the envelope, said flap having a statement form printed on its inside surface, and a disposable selvage portion integral with said flap and extending laterally therefrom beyond the main body of the envelope, said portion having a plurality of apertures therein aligned at a right angle to the juncture of said flap and said one of the walls of the envelope, each of said apertures acting to receive one of said lugs therein for registering the statement form relative to at least one other form.

2. The combination of claim 1 in which there is a line between said apertures and said flap to facilitate the removal of said portion.

3. The combination of claim 2 in which said line is a row of perforations to assist in tearing said portion from said flap.

4. The combination of claim 1 in which there is a line extending across the flap to facilitate the removal of the part of the flap bearing the statement form.

5. The combination of claim 4 in which said line is a row of perforations.

6. The combination of claim 4 in which the elongated flap is scored for easy folding between said line and the main body of the envelope to provide a cover for the envelope.

7. The combination of claim 4 in which there is adhesive material on the inside surface of the flap adjacent the upper edge thereof to seal the flap to the outer surface of the envelope when folded down thereover.

8. The combination of claim 4 in which there is adhesive material on a section of the inside surface of the flap between said line and the envelope proper to seal said section to the outer surface of the envelope after the portion of the flap above said line has been removed.

References Cited by the Examiner

UNITED STATES PATENTS

| | | |
|---|---|---|
| 1,371,670 | 3/1921 | Dority et al. |
| 2,145,500 | 1/1939 | Townsend _____ 281—3 |
| 2,165,195 | 7/1939 | Sawdon. |
| 2,686,005 | 8/1954 | Hyman _____ 229—73.170 |
| 2,687,902 | 8/1954 | Becker. |

FOREIGN PATENTS 567,947    3/1945    Great Britain.

LAWRENCE CHARLES, *Primary Examiner.*

F. F. GARRETT, JEROME SCHNALL, *Examiners.*

D. M. BOCKENEK, *Assistant Examiner.*